United States Patent [19] [11] 4,205,856
Hayashi [45] Jun. 3, 1980

[54] PICKUP CARTRIDGE

[75] Inventor: Ken Hayashi, Tokyo, Japan

[73] Assignee: Stax Industries Limited, Tokyo, Japan

[21] Appl. No.: 932,382

[22] Filed: Aug. 9, 1978

[30] Foreign Application Priority Data

Aug. 11, 1977 [JP] Japan .......... 52-106625[U]
Feb. 28, 1978 [JP] Japan .......... 53-24094[U]

[51] Int. Cl.[2] .......... G11B 3/02
[52] U.S. Cl. .......... 274/37
[58] Field of Search .......... 274/37, 47

[56] References Cited

U.S. PATENT DOCUMENTS

| | | | |
|---|---|---|---|
| 2,563,860 | 8/1951 | Moore | 274/37 X |
| 2,991,331 | 7/1961 | Ross | 274/47 |
| 3,377,439 | 4/1968 | Rouy | 274/37 X |
| 3,992,017 | 11/1976 | Mori et al. | 274/37 |

*Primary Examiner*—Charles E. Phillips
*Attorney, Agent, or Firm*—Sughrue, Rothwell, Mion, Zinn and Macpeak

[57] ABSTRACT

A pickup cartridge for reproducing disk-shaped record carriers having a spiral groove as an information track carrying audio and/or video information. A horn-shaped resilient seal member prevents entry of foreign matters, such as moisture or dust into the cartridge casing, through which member a cantilever carrying at its front end a stylus extends. This seal member keeps characteristics of the cartridge transducer within the casing always optimum.

6 Claims, 6 Drawing Figures

10

PICKUP CARTRIDGE

BACKGROUND OF THE INVENTION

The present invention relates to a pickup cartridge for reproducing disk-shaped record carriers having an information track in the form of a spiral groove on which audio and/or video information is recorded. More particularly, the present invention relates to a pickup cartridge comprising a shielded casing, a cantilever which at its one end being pivotally supported within the casing and projecting from the casing through an opening formed in a wall of the casing, a stylus carried by the cantilever at its free end, the opening during reproduction of the record carriers allowing omnidirectional movement of the stylus and the cantilever about the pivoted end of the cantilever, and a transducer arranged within the casing in the vicinity of the opening.

The pickup cartridge of this kind is known from, for example, Japanese Patent Application Laid Open Publication No. 8,502/73. In such a pickup cartridge, since the transducer is close to the stylus, the cantilever is used only as a carrier of the stylus, and not for transmitting the movement of the stylus to the transducer. Thus, audio and/or video information recorded on the record carrier and detected as mechanical vibration of the stylus is transduced directly, by means of the transducer, into electrical signal without being affected by the compliance of the cantilever. By this reason, the weight of the cantilever, and hence the effective moving mass of the pickup cartridge can be greatly reduced.

Because of the undulation of the spiral groove of the record carrier or unevenness of the surface thereof, the stylus at the free end of the cantilever is forced to move omnidirectionally about the pivoted end of the cantilever substantially in a plane perpendicular to the longitudinal axis of the cantilever by an amount of approximately 1.5 mm. The opening formed in a wall of the shielded casing of the cartridge is to allow such a movement of the stylus. This opening, however, permits entry of foreign matters, such as moisture, dust or fine particles which are liable to accumulate onto the transducer deteriorating characteristics thereof. This undesired entry of the foreign matters takes place under electrostatic or electromagnetic force induced by the transducer.

In order to avoid an accumulation of the foreign matters onto the transducer thereby maintaining the characteristics of the cartridge always optimum, the present inventor proposed in Japanese Patent Application Laid Open Publication No. 159,358/77, to dispose in the vicinity of the opening and within the casing, a dummy transducer in the form of electrette which serves to collect the foreign matters thereon. By this arrangement, the actual transducer used to transduce the information is free from the foreign matters. Nevertheless, the total performance of the pickup cartridge thus obtained was not satisfactory since, in order to obtain optimum collection efficiency of the dummy transducer, this transducer has to be disposed close to the opening where the actual transducer would have to be positioned to obtain the optimum characteristics of the pickup cartridge.

SUMMARY OF THE INVENTION

Accordingly, it is an object of the present invention to provide a pickup cartridge wherein entry of the foreign matters into the casing is provented, thus avoiding accumulation of the foreign matters onto the transducer without providing a dummy transducer.

Another object of the invention is to provide a pickup cartridge including a seal member to close the opening in the casing without disturbing the movement of the cantilever, and hence of the stylus.

Yet, another object of the invention is to provide a pickup cartridge including a seal member to close the opening in the casing and, at the same time, to shield the transducer electrostatically.

In order to attain these objects, according to the invention, the pickup cartridge as referred to at the beginning of this specification is characterized in that a hornshaped seal member is provided which consists of resilient material and is formed with a flange-shaped first portion having relatively large diameter which tightly contacts with the peripheral wall defining said opening, and with a second portion having relatively small diameter disposed within the casing and tightly surrounding the peripheral surface of the cantilever, the first and the second portions forming a cavity which allows the free movement of the cantilever with the second portion following said movement of the cantilever, whereby foreign matters are prevented from entering into the casing.

The present invention will now be described in detail with reference to the preferred embodiment thereof shown in the drawings, in which.

DETAILED DESCRIPTION OF THE INVENTION

Figure 1:
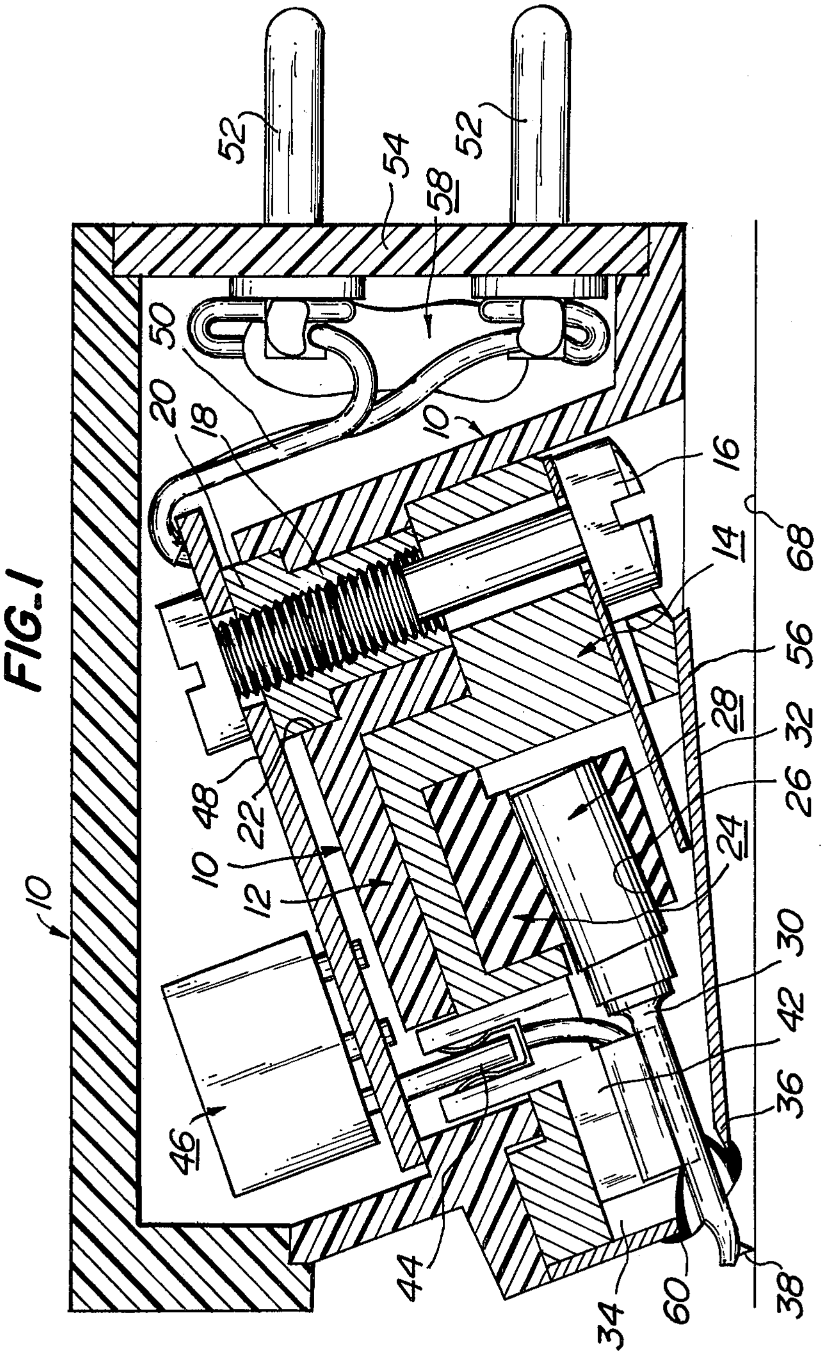
FIG. 1 is a longitudinal sectional view of the pickup cartridge according to one embodiment of the invention, wherein the transducer is of electrostatic type.

Referring now to FIG. 1, there is shown a pickup cartridge according to one embodiment of the invention for taking out audio information out of a sound groove of a phonograph record. The cartridge comprises an electrostatically shielded casing 10 adapted to be secured to a cartridge shell, not shown. The cartridge shell, in turn, is mounted at the free end of a tone arm. In the casing 10 is disposed a replacable unit or a stylus assembly 12.

The stylus assembly 12 comprises a base member 14 which is secured to the casing 10 by means of a screw 16 which is accessible from the exterior of the casing 10. The screw 16 is threaded into the lower portion of a bush 18 having an upper shoulder portion 20 which is received within a correspondingly shaped bore 22 formed in the casing 10. The casing 10 and the bush 18 are connected together in an integral fashion by suitable means, not shown, such as bonding agent or a screw. A cantilever holder 24 having a cylindrical opening 26 therein is secured to the base member 14. Within this opening 26, there is disposed a cylindrical damper member 28 consisting of resilient material, such as rubber. The damper member 28 tightly holds rear end of a hollow cylindrical cantilever 30 in a pivotal manner so as to permit an omnidirectional movement of the cantilever about its rear end. A shield plate 32 is secured to the base member 14 to substantially seal the cavity or transducer chamber 34 formed by the member 14 to accomodate the cantilever 30 and a transducer unit. This plate 32 is formed with an opening 36 through which the cantilever 30 extends out of the chamber 34. The cantilever 30 at its front end carries a stylus 38 which moves along a sound groove of a disc phonograph record 68.

Figure 2:
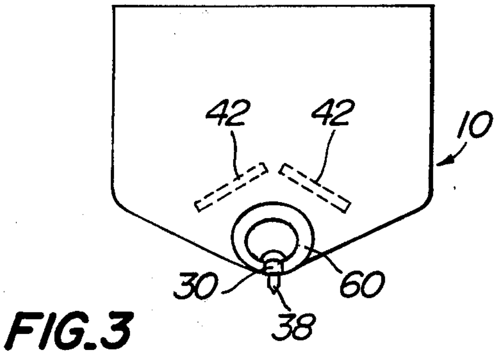
FIG. 2 is a schematic front view of the cartridge shown in FIG. 1, and showin an arrangement of the fixed and movable electrodes of the transducer.

In the embodiment shown in FIG. 1, the cartridge is of electrostatic or electrette condenser-type. Thus, the cantilever 30 consists of electrically conductive material to form a movable electrode. But, the electrode may be a thin conductive layer formed on the cantilever 30 within the casing 10 and in the vicinity of the opening 36, the cantilever by itself consisting of non-conductive material. Opposing to the movable electrode are a pair of fixed electrette electrodes 42 at right angle to each other and at 45° with respect to the vertical plane passing through longitudinal axis of the cantilever, as shown in FIG. 2, so as to form a pair of condensers of which the first and the second condensers correspond to right and left channels, respectively. The capacitance of the respective condensers will vary in accordance with movement of the stylus 38, and hence of the moving electrode. This variation is transmitted through connectors 44, an integrated circuit 46 to convert the impedance of the detected signal, a print circuit board 48 and leads 50 to output terminals 52 which are secured to a rear face plate 54 connected integrally to the rear part of the casing 10. Shown at 56 is a ground plate to electrically connect the shield plate 32 with an earth point of the circuit board 48, and 58 a source resistor.

The pickup cartridge of the above described construction is commercially available as CP-X Condenser Pickup Cartridge manufactured by Stax Ind. Ltd., Tokyo, Japan. Since the transducer condensers are disposed within the casing 10 adjacent to the opening 36, the compliance of the cantilever 30 never affects the output signal of the transducer, thus assuring high fidelity of the information to be reproduced.

According to the invention, the opening 36 formed in the shield plate 32 is sealed by a funnel or horn-shaped seal member 60 consisting of resilient material, such as extremely soft natural or synthetic rubber. The seal member 60 comprises an outer end 62 with relatively larger diameter and formed as a flange which tightly contacts with the outer periphery of the opening 36 of the shield plate 32, and an inner end 64 with relatively smaller diameter which tightly surrounds the outer peripheral surface of the cantilever 30. Thus, the seal member 60 seals the interior of the transducer chamber 34, and avoids entry of external foreign matters, such as moisture, dust or fine particles into the chamber 34. Otherwise, such foreign matters enter through the opening 36 into the transducer chamber 34 and tend to accumulate onto the surface of the transducer condensers varying the capacitance thereof or lowering the output signal level which results in deterioration of characteristics of the transducers. Further, the seal member 60 contacts with the cantilever 30 at its inner end 64 only, and the rest parts of the member 60, forming a cavity 66 without contacting with the cantilever 30, permit free movement of the cantilever 30 about its rear pivoted end.

Figure 3:
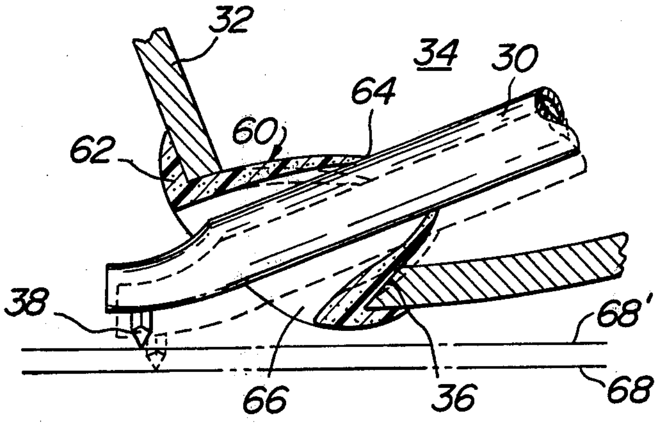
FIGS. 3 and 4 are enlarged fragmentary views of the stylus assembly shown in FIG. 1, respectively, and showing the deformation of the seal member is accordance with the movement of the stylus.
Figure 4:
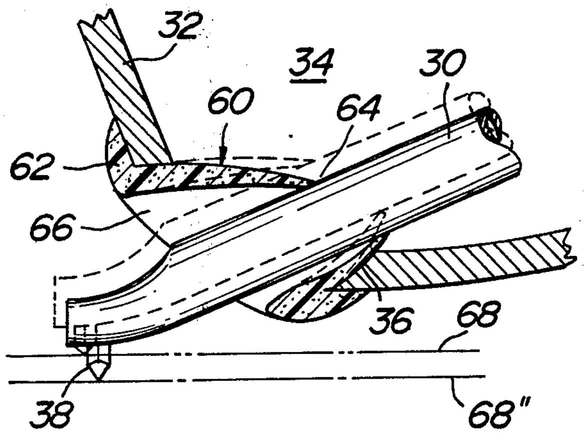

This is shown in FIGS. 3 and 4, wherein unevennes of the surface of the disk record causes the stylus to move vertically. In those figures, the surface 68 of the record moves to a higher level 68' or a lower level 68" thus displacing the stylus and the cantilever to a higher position or to a lower position shown respectively by solid lines, while the normal position of the stylus and the cantilever are shown by broken lines. Such an unevenness amounts sometimes to approximately 1.5 mm. But it is to be noted that the vertical displacement of the stylus due to audio information only, in the form of varying height of the sound groove, will be less than 70 μm, which is well within the elastic limit of the seal member. Although not shown, undulation of the sound groove of the record displaces the stylus laterally but in the same manner described above.

Typically, the particulars of the seal member 56 is as follows.

Length: 1.5 mm
Inner diameter: 0.8 mm (min.) to 1.5 mm (max.)
Diameter of the flange: 2.5 mm
Thickness: 0.05 mm (min.) to 0.2 mm (max.)
Material: Butyl rubber
Hardness: 10° according to JIS 6300

The compliance of the stylus of the Stax CP-X Condenser Pickup Cartridge with and without the seal member 56 according to the invention will be about $17\times10^{-6}$ [cm/dyne], and $20\times10^{-6}$ [cm/dyne], respectively. It is appreciated, therefore, that the above-named cartridge with the seal member still exhibits high compliance, since average compliance of normal moving coil-type or moving magnet-type cartridge is about $10\times10^{-6}$ [cm/dyne]. Moreover, this slight reduction in the compliance assures the transducer to be used always in its optimum condition free from foreign matters.

In order that the transducer is shielded completely, the seal member 60 may consist of synthetic rubber coated with an electrically conductive layer serving as electrostatic shield. Alternatively, the seal member 60 may consist of synthetic rubber mixed with electrically conductive material.

Figure 5:
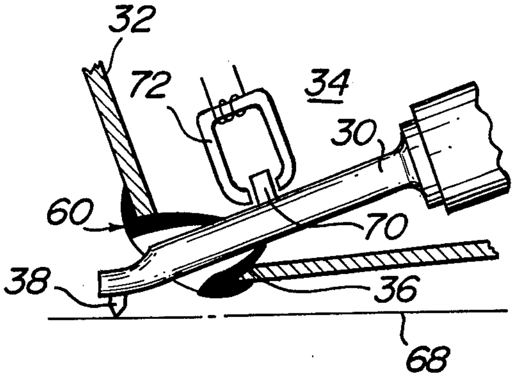
FIG. 5 is a longitudinal sectional view of the stylus assembly according to another embodiment of the invention, wherein the transducer is of moving magnet type.

FIG. 5 shows another embodiment of the pickup cartridge according to the invention which is of moving magnet type. In place of the condenser transducer shown in FIG. 1, the cartridge of the present embodiment comprises a pair of magnets 70 secured to the cantilever 30 to form movable parts of the transducer, and a pair of coils 72 fixed within the casing 10. In the figure, one of the magnets and one of the coils are not shown because of their location. Except for the difference in type of the transducer, this cartridge functions in the same manner with that shown in FIG. 1.

Figure 6:
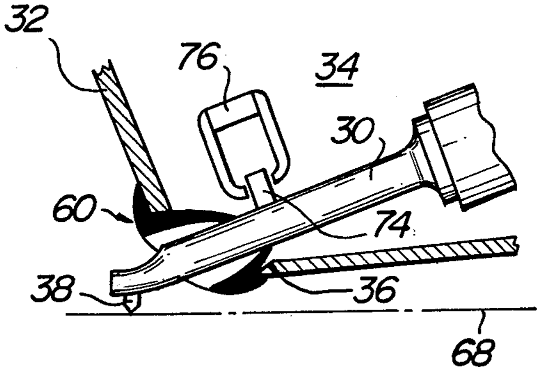
FIG. 6 is a longitudinal sectional view of the stylus assembly according to a further embodiment of the invention, wherein the transducer is of moving coil type.

FIG. 6 shows still another embodiment of the pickup cartridge according to the invention, similar to that shown in FIG. 5, but which is of moving coil type. In this embodiment, the transducer consists of a pair of movable coils 74 secured to the cantilever 30, and a pair of fixed magnets 76. In this figure, too, one of the coils and one of the magnets are not shown.

In the embodiments shown in FIGS. 5 and 6, the seal member 60 keeps the transducer chamber 34 free from foreign matters.

While certain preferred embodiments of the invention are shown and described, it is to be noted that various modifications and changes are apparent for those skilled in the art without departing from the scope of the invention. For example, the cartridge may be used to reproduce audio and video information recorded on a video disk.

What is claimed is:

1. A pickup cartridge for reproducing diskshaped record carriers having an information track in the form of a spiral groove on which audio and/or video information is recorded, and including a shielded casing, a cantilever, damping means pivotally mounting the cantilever within the casing at its one end to dampen mechanical vibrations thereof, said cantilever projecting from the casing through an opening formed in a wall of the casing, a stylus carried by the cantilever at its other, free end, the opening during reproduction of the record carriers allowing omnidirectional movement of the stylus and the cantilever about the pivoted end of the cantilever, and a transducer arranged within the casing in the vicinity of the opening, characterized by: a funnel-shaped dust and moisture seal member consisting of resilient material and formed with a flangeshaped first portion having a relatively large diameter which tightly contacts the peripheral portion of the casing wall defining said opening, and with a second portion having a relatively small diameter extending within the casing and tightly surrounding the peripheral surface of the cantilever, the first and the second portions forming a tapering cavity which allows the free movement of the cantilever with the second portion following said movement of the cantilever, whereby foreign matter is prevented from entering into the casing.

2. A pickup cartridge as defined in claim 1, characterized in that the seal member consists of natural rubber or synthetic rubber, such as butyl rubber.

3. A pickup cartridge as defined in claim 2, characterized in that the seal member consists of synthetic rubber coated with an electrically conductive layer serving as an electrostatic shield for the transducer.

4. A pickup cartridge as defined in claim 2, characterized in that the seal member consists of synthetic rubber mixed with electrically conductive material serving as an electrostatic shield for the transducer.

5. A pickup cartridge as defined in claim 1, characterized in that the transducer is an electrostatic transducer.

6. A pickup cartridge as defined in claim 1, characterized in that the transducer is an electromagnetic transducer.

* * * * *